(12) United States Patent
McGrath (10) Patent No.: US 8,973,876 B1
(45) Date of Patent: Mar. 10, 2015

(54) ADJUSTABLE BRACKET ASSEMBLY

(76) Inventor: Andrew H. McGrath, Concord, CA (US)

( * ) Notice: Subject to any disclaimer, the term of this patent is extended or adjusted under 35 U.S.C. 154(b) by 846 days.

(21) Appl. No.: 13/233,918

(22) Filed: Sep. 15, 2011

Related U.S. Application Data (63) Continuation-in-part of application No. 12/699,602, filed on Feb. 3, 2010, now Pat. No. 8,302,919.

(51) Int. Cl.
*A47B 96/06* (2006.01)
(52) U.S. Cl.
USPC ......... 248/205.1; 248/121; 248/398; 248/515
(58) Field of Classification Search
USPC ............ 248/118, 288.11, 289.11, 291.1, 398, 248/515
See application file for complete search history.

(56) References Cited

U.S. PATENT DOCUMENTS

| | | | | | |
|---|---|---|---|---|---|
| 1,137,333 | A | * | 4/1915 | Klorer | 403/57 |
| 2,548,650 | A | * | 4/1951 | Brandt | 248/413 |
| 3,543,312 | A | * | 12/1970 | Pofferi | 108/49 |
| 4,443,128 | A | * | 4/1984 | Yamamoto et al. | 403/385 |
| 6,588,863 | B1 | * | 7/2003 | Yatchak et al. | 312/140.4 |
| 2007/0236112 | A1 | * | 10/2007 | Williman | 312/140.4 |

* cited by examiner

*Primary Examiner* — Gwendolyn Baxter
(74) *Attorney, Agent, or Firm* — Charles L. Thoeming

(57) ABSTRACT

A bracket assembly for adjustably and releasably affixing bracket elements to an adjustable elongated support member includes a cylindrical base, at least one cylindrical core having an orthogonal arm, and a cylindrical cap. The bracket assembly provides adjustable vertical bracket positioning by the adjustable elongated support member. Abutting bracket assembly cylindrical cores provide a range of orthogonal arm positions 180 degrees or less, one to the other. The orthogonal arm provides additional 360 degree adjustable positioning for any element attached to the arm outward end.

10 Claims, 6 Drawing Sheets

ADJUSTABLE BRACKET ASSEMBLY

CROSS-REFERENCES TO RELATED APPLICATIONS

This U.S. non-provisional utility patent application is a continuation-in-part of U.S. non-provisional utility patent application Ser. No. 12/699,602 filed Feb. 3, 2010.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to ready-to-assemble components used in adjustable bracket assemblies for adapting to and connecting one or more substantially external support member(s) defined by the particular utility of the overall assembly to a vertically adjustable support structure. Such ready-to-assemble components can be typically, but not exclusively, employed to releasably affix a plurality bracket elements to an adjustable elongated support member.

BACKGROUND OF THE INVENTION

Adjustable height supports and bracketing are well known in the art and typically comprise an upright or support member, some separate assembly for supporting a platform or similar assembly, apparatus for moving the separate assembly along or around the elongated support member, and an assembly for securing the elongated support member.

Designing and assembling these elements is ordinarily complicated since dimensions, load factors, code requirements, and aesthetics converge to present brackets which are labor and component intensive. Often bracketing assemblies will have many component parts and require several tools for assembly. Moreover, with current technology, bracket assembly or positional adjustment of an assembled bracket requires more than one person and is time consuming.

Many ready to assemble bracket assemblies utilize location dependent uprights or support members that multiply the effort needed to design and assembly the bracketing components and that intensify the complexity of the process. Presently most bracketing assemblies are installed by the seller because of the complexity of assembling. Thus, many bracketing assemblies are handled fully or most fully assembled which presents bulky cargo that takes up considerable amount of space and is difficult to transport.

Additionally, when one part of a piece of bracketing assembly is damaged, often the entire product must be returned instead of the damaged part. For example, when an upright or support member fails or is defective, often the entire bracketing assembly must be replaced.

Finally, the bracket assembly needs to be supported by adequate and aesthetically pleasing attachment components for securing the assembly to one or more fixed support structures.

DISCLOSURE OF INVENTION

The present invention relates to adjustable bracketing assemblies that can be employed readily over a wide array of bracketing applications to securely connect a variety of bracket elements to an elongated support member, while still satisfying the complement of requirements presented by dimensions, load factors, codes, and design preferences. Furthermore, the bracketing apparatus disclosed and claimed herein has been fashioned in such a manner as to maximize its utility over a broad range of applications, while minimizing the labor, parts and tools required for implementation. Since the apparatus is characterized by its universality and relative simplicity and ease of installation, it serves to fulfill both original and retrofit bracketing applications. The multiple adjustment features of the apparatus require less "design customizing" for a given installation, thus providing demonstrable cost savings.

The adjustable bracketing assembly includes connector apparatus for mounting and securing bracket elements to at least one elongated support member, and allowing for positional adjustment of the elements along the elongated support member longitudinal axis, or around a fixed position on the elongated support member.

The adjustable bracketing assembly provides a cylindrical base portion having an internally threaded portion sized to receive and hold a threaded and slotted cylindrical core having an internal diameter sized to receive and affix to an elongated support member. A cap portion is sized to fit on top of the slotted cylindrical core, and be affixed thereto by at least one fastener. The cap portion has an arm orthogonally disposed to the cylindrical core/base assembly. The arm has at least one fastener assembly at the outward arm end for attachment of bracketing hardware as defined by the bracketing application.

Other features, advantages, and objects of the bracket assembly will become apparent with reference to the following description and accompanying drawings.

MODES FOR CARRYING OUT THE INVENTION

Referring now to FIGS. 1-10, a cylindrical base 20, a cylindrical core 40, and a cylindrical cap portion 70 are provided for an embodiment of bracket assembly 10

Figures 8, 9, 10:
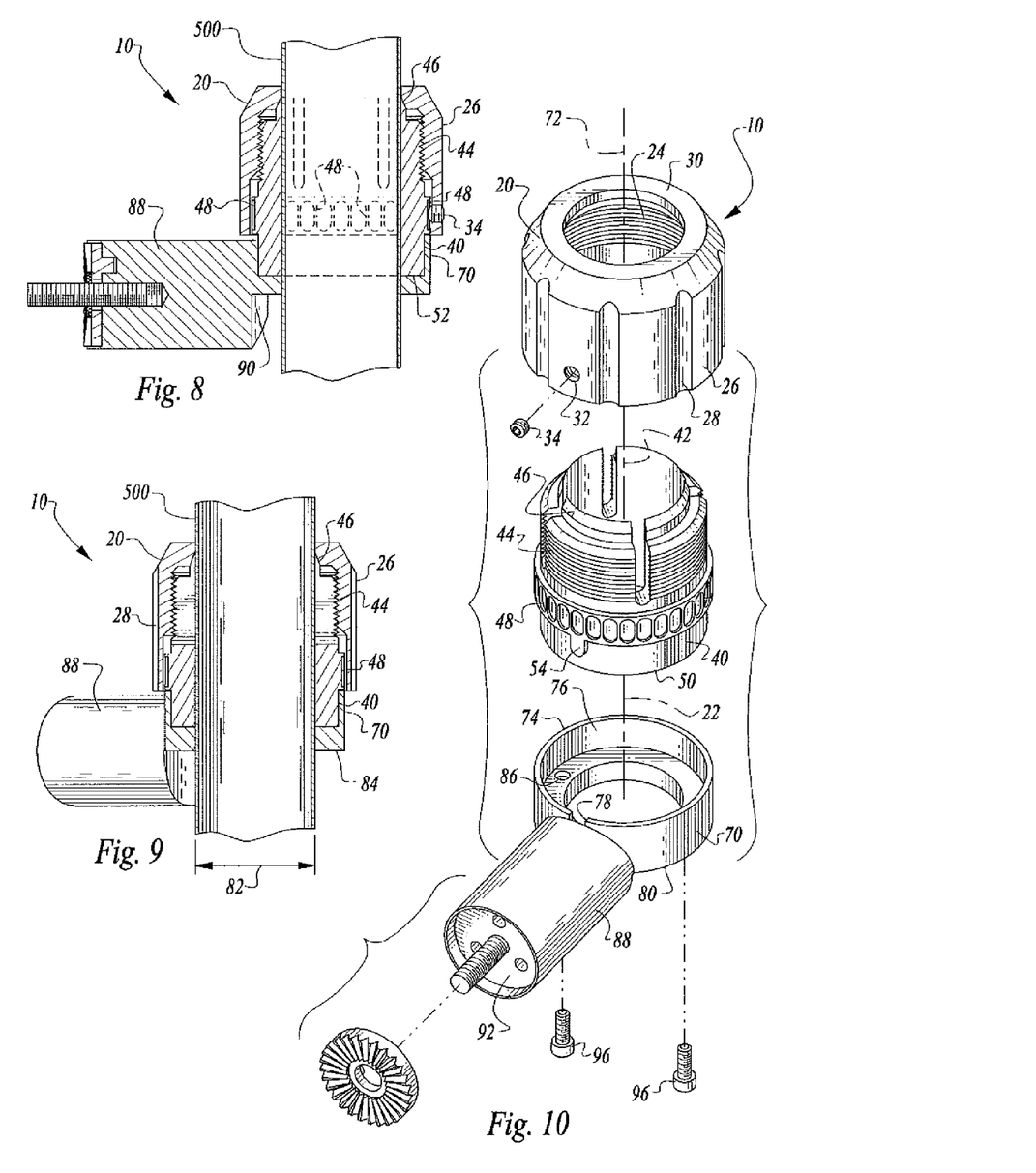
FIG. 8 is a section view of the bracket assembly 10 of FIG. 5 taken at "8-8."
FIG. 9 is a section view of the bracket assembly 10 of FIG. 4 taken at "9-9."
FIG. 10 is an exploded bracket assembly 10 depicting the cylindrical base 20, cylindrical core 40, and the cylindrical cap 70, and selected elements for each of the bracket assemblies of FIGS. 1-9.

The bracket assembly 10 includes a cylindrical base 20 having: a cylindrical base central longitudinal axis 22; a cylindrical base internally threaded portion 24; a cylindrical base larger diameter open end 26; cylindrical base external surface longitudinal gripping notches 28; a cylindrical base mitered end 30; and a cylindrical base threaded opening 32 to correspond with a cylindrical core circumferential locking element band 48; and at least one threaded fastener 34 for securing the cylindrical base 20 to the cylindrical core circumferential locking element band 48 through the cylindrical base threaded opening 32.

The bracket assembly 10 further includes a cylindrical core 40 having: a cylindrical core central longitudinal axis 42; a cylindrical core externally threaded, compression flange element end 44; a cylindrical core externally threaded, compression flange element end tapered and mitered end 46; a cylindrical core circumferential locking element band 48; a cylindrical core cylindrical open end 50; a cylindrical core cylindrical open end flat circular top surface 52; a cylindrical core cylindrical open end longitudinally disposed external tongue 54; and at least one cylindrical core threaded opening positioned in the cylindrical open end flat circular top surface 56 orthogonal to the cylindrical open end flat circular top surface 52.

The bracket assembly 10 further includes a cylindrical cap 70 having: a cylindrical cap central longitudinal axis 72; cylindrical cap first end 74; a cylindrical cap first end circular diameter 76; a cylindrical cap first end circular diameter longitudinally disposed internal groove 78; a cylindrical cap second end 80; a cylindrical cap portion second end circular diameter 82; a cylindrical cap second end flat circular top surface 84; a cylindrical cap second end flat circular top surface flush mount opening 86 orthogonal to the second end flat circular top surface flush mount opening 86; an arm affixed to cylindrical cap portion orthogonally disposed to the central longitudinal axis 88; an orthogonally affixed arm first end 90; and an orthogonally affixed arm second end 92.

The cylindrical core 40 is sized to fit into the cylindrical base 20 by the cylindrical core externally threaded, compression flange element end 44 being threaded into the cylindrical base internally threaded portion 24. Once the cylindrical core 40 is threaded into the cylindrical base 20, the cylindrical base central longitudinal axis 22 and the cylindrical core central longitudinal axis 42 are uniformly overlapped.

The cylindrical cap 70 is sized to fit onto the cylindrical core 40 by the cylindrical cap first end 74 receiving the cylindrical core cylindrical open end flat circular top surface 52 in the cylindrical cap first end circular diameter 76. Alignment of the cylindrical cap 70 and the cylindrical core 40 is positioned by the cylindrical core cylindrical open end longitudinally disposed external tongue 54 fitting into and being received by the cylindrical cap first end circular diameter longitudinally disposed internal groove 78.

The cylindrical cap 70 is secured to the cylindrical core 40 by fasteners 96 through each cylindrical cap second end flat circular top surface flush mount opening 86 and into each cylindrical core threaded opening in the cylindrical open end flat circular top surface 56. Once the cylindrical core 40 is received into and secured by the cylindrical cap 70, the cylindrical base central longitudinal axis 22 and the cylindrical cap central longitudinal axis 72 are uniformly overlapped.

Figure 1:
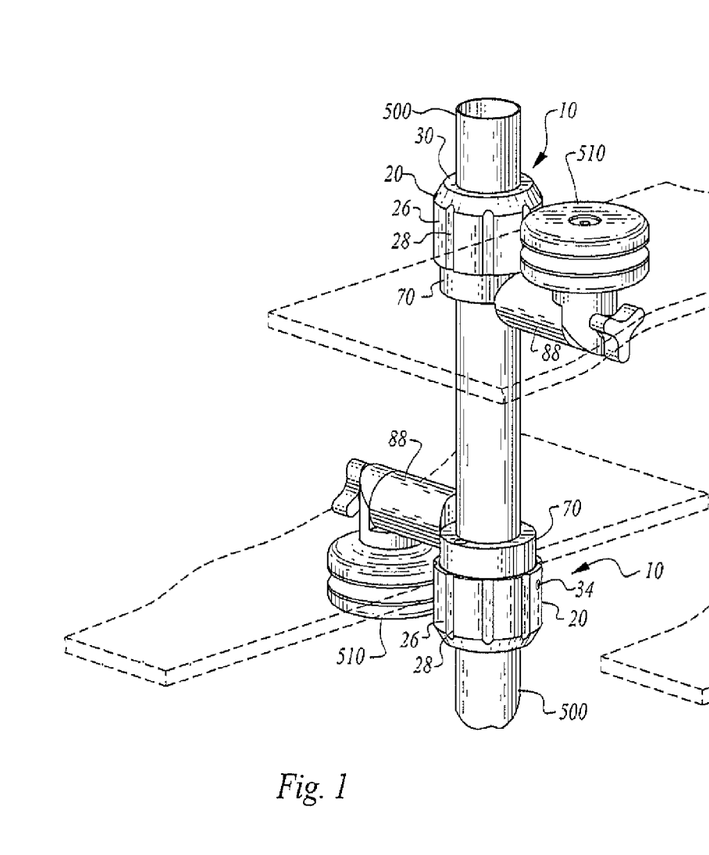
FIG. 1 is a perspective view of an embodiment of bracket assemblies 10 positioned on an elongated support member 500 and having rotatably attached elements 510 on each orthogonally affixed arm second end 92.
Figure 2:
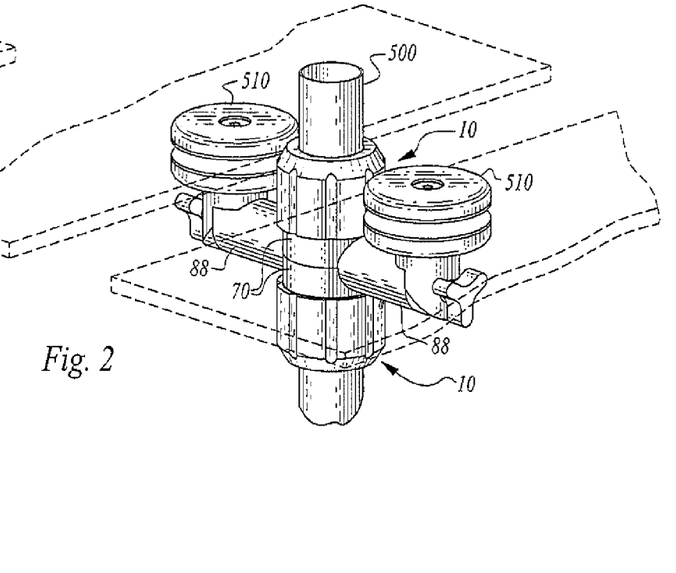
FIG. 2 is a perspective view of an embodiment of bracket assemblies 10 positioned on an elongated support member 500 with positioned abutting cylindrical caps 70 to allow arms affixed to cylindrical cap portion orthogonally disposed to the central longitudinal axis 88 to receive bracketing hardware in each respective rotatably attached element 510 on each orthogonally affixed arm second end 92 whereby the bracketing hardware is configured along a contiguous plane on either side of the elongated support member 500.
Figure 3:
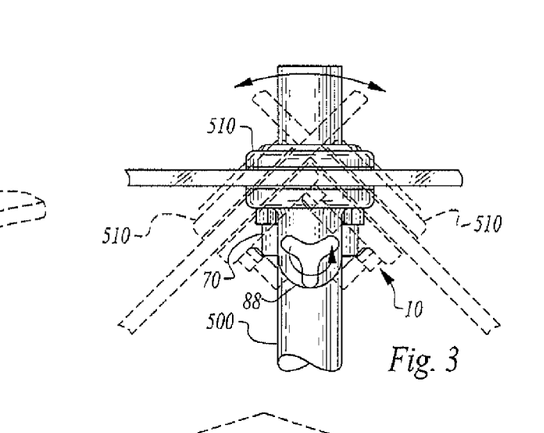
FIG. 3 is an elevation view of an embodiment of bracket assembly 10 depicting a portion of the 360 degree range of motion and positions for a rotatably attached element 510 on the second end 92 of orthogonally affixed arm 88.
Figures 4, 5, 6, 7:
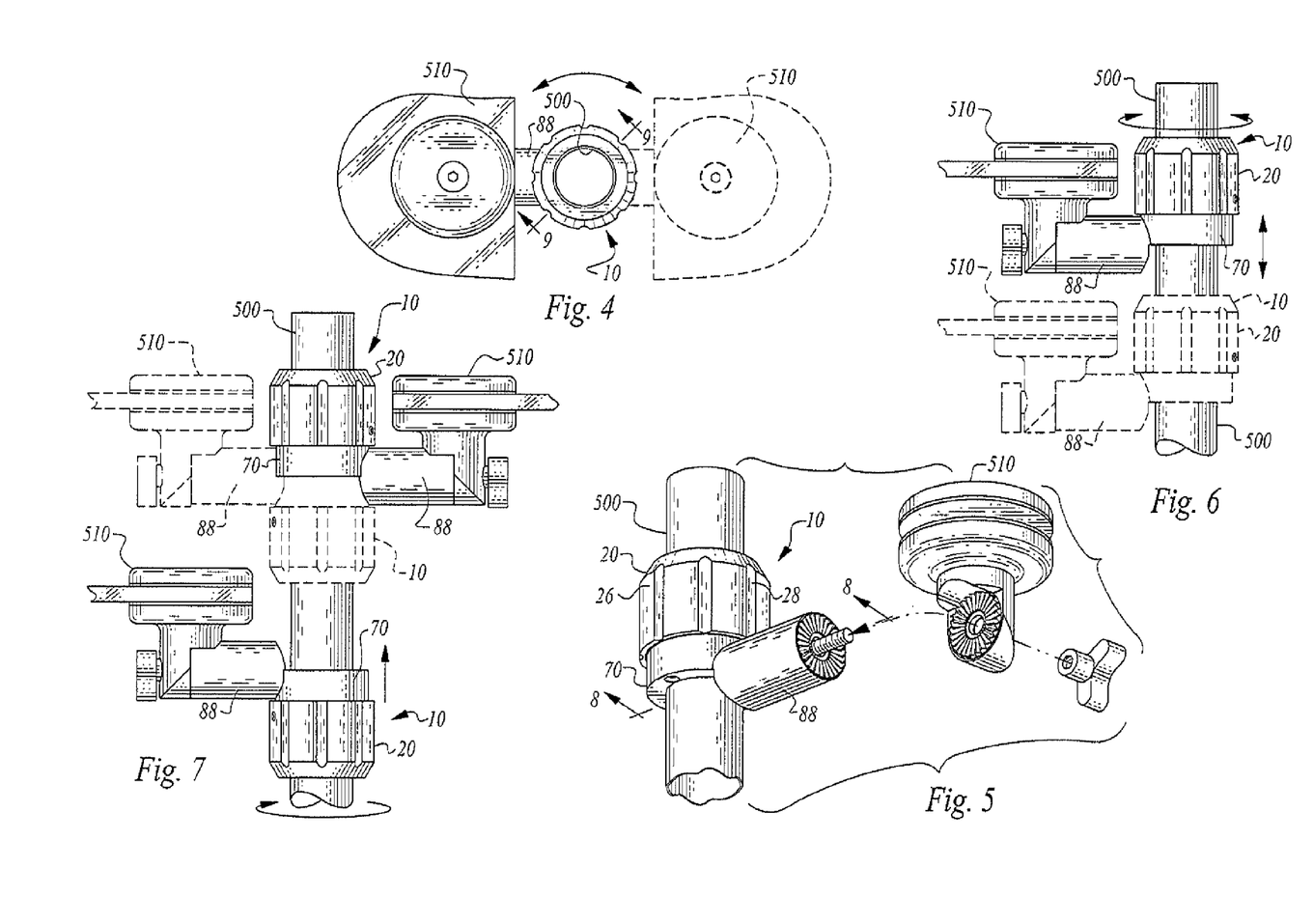
FIG. 4 is a top planar view of an embodiment of bracket assembly 10 of FIG. 1 depicting a portion of the 360 degree range of motion and positions for a rotatably attached element 510 on the orthogonally affixed arm second end 92 about a common locus of points around the outside diameter of the elongated support member 500.
FIG. 5 is an exploded perspective view of an embodiment of bracket assembly 10 of FIG. 1 depicting the 360 degree rotatably attached element 510 on the second end 92 of orthogonally affixed arm 88.
FIG. 6 is an elevation view of an embodiment of bracket assembly 10 of FIG. 1 depicting a portion of the vertical and 360 degree rotational range of motion and positions for the bracket assembly 10 and the cylindrical base external surface longitudinal gripping notches 28 along and about the elongated support member 500.
FIG. 7 is an elevation view of an embodiment of bracket assemblies 10 of FIG. 1 depicting how two bracket assemblies 10 can be positioned with abutting cylindrical caps 70 to provide bracketing hardware in each respective rotatably attached element 510 on the second end 92 of orthogonally affixed arm 88 in the contiguous plane of FIG. 2 on either side of the elongated support member 500.

The assembled bracket assembly 10 can receive the elongated support member 500 from either the cylindrical base 20 or the cylindrical cap 70, since both the cylindrical base opening 32 and corresponding cylindrical core externally threaded, compression flange element end tapered and mitered end 46 and the cylindrical cap portion second end circular diameter 82 have equally sized diameters corresponding to the diameter of the elongated support member 500. In this manner, at least two bracket assemblies 10 can be positioned with abutting cylindrical caps 70 to allow arms affixed to cylindrical cap portion and orthogonally disposed to the cap portion central longitudinal axis 88 to receive bracketing hardware in each respective rotatably attached element 510 on each orthogonally affixed arm second end 92 using any of the connection members from my U.S. Pat. No. 6,132,018 (the "'018 patent") (FIGS. 11-13 of the '018 patent) which are incorporated by reference as if fully set forth herein, in the orthogonally affixed arm second end 92. For the preferred embodiment of a bracket assembly for sneezeguard applications, FIGS. 2 and 3, this alignment feature of the bracket assembly provides an assembly that can easily and readily adjust vertically and rotatably 360 degrees with respect to the elongated support member 500, while also providing 360 degree positional adjustment for any bracketing hardware. In this illustrated embodiment, the bracketing hardware is a sneezeguard glass element, affixed to the bracket assembly. As also depicted in FIG. 2, the preferred embodiment of bracket assembly also allows assembly of sneezeguard glass elements at equal height and angular adjustment to provide, as one possible assembly, sneezeguard glass protection in a continuous plane extending on either side of the elongated support member 500. Similarly, the rotatably attached element 510 on each orthogonally affixed arm second end 92 may be positioned at any angle less than 180 degrees from the companion rotatably attached element 510 for bracket assemblies 10 abutting cylindrical caps 70 on an elongated support member 500.

Once positioned on the elongated support member 500, the assembled bracket assembly 10 can readily and simply be repositioned upwards or downwards or rotationally on the elongated support member 500 by operating the cylindrical base 20 in a counterclockwise position relative to the cylindrical core externally threaded, compression flange element end 44, FIGS. 4-7, 10. Once the assembled bracket assembly 10 is in the desired position relative to the length of the elongated support member 500, the bracket assembly 10 is tightened onto the elongated support member 500 in the desired position by operating the cylindrical base 20 in a clockwise position relative to the cylindrical core externally threaded, compression flange element end 44. The cylindrical base 20 can then be locked into the tightened rotational position relative to the cylindrical core 40 by threaded fastener 34 through the cylindrical base threaded opening 32 corresponding with a position on the cylindrical core circumferential locking element band 48. Rotational operation of the cylindrical base 20 is enhanced by a plurality of cylindrical base external surface longitudinal gripping notches 28. Similarly, the rotatably attached element 510 on one orthogonally affixed arm second end 92 may be positioned at any angle 180 degrees or less from the companion rotatably attached element 510 on a second orthogonally affixed arm second end 92 for bracket assemblies 10 having abutting cylindrical caps 70 on an elongated support member 500, FIGS. 1-7. This range of bracket assembly 10 positional arrangement provides the ability to meet a multitude of design and utility requirements quickly, easily and with a minimum number of components.

Anyone of a number of different bracket hardware rotatable elements 510 may be fitted onto each cylindrical cap 70 orthogonally affixed arm second end 92 by the attachment assemblies described in my '018 patent, which are incorporated by reference as if fully set forth herein, according to the desired utility of the overall bracketing hardware application.

The cylindrical base 20 and the cylindrical cap 70 are separate, unitary pieces preferably made of a strong metal such as aluminum or steel, or high strength carbon materials such as carbon fiber and carbon fiber-reinforced polymer. The cylindrical core 40 is a separate, unitary piece preferably made of an advanced plastic, polyvinyl chloride, Teflon®, or high strength carbon materials such as carbon fiber and carbon fiber-reinforced polymer.

Referring now to FIGS. 11-20, a cylindrical base 530, cylindrical cores 570 and 592, and a cylindrical cap portion 594 are provided for an embodiment of bracket assembly 12.

Figure 14:
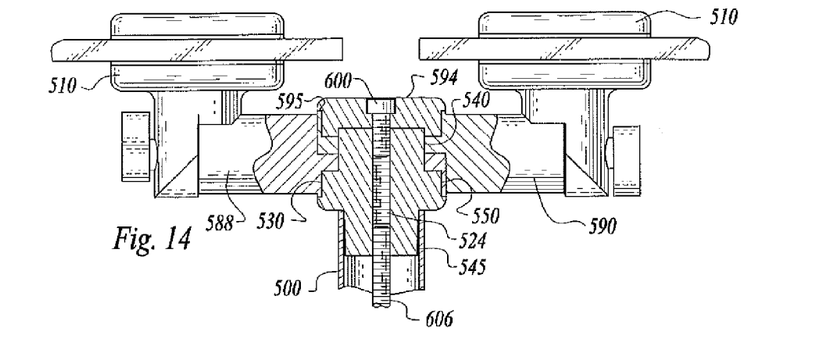
FIG. 14 is a cross-sectional view of an embodiment of the bracket assemblies 12 affixed to an elongated support member 500 of FIG. 11 taken at "14-14."
Figure 18:
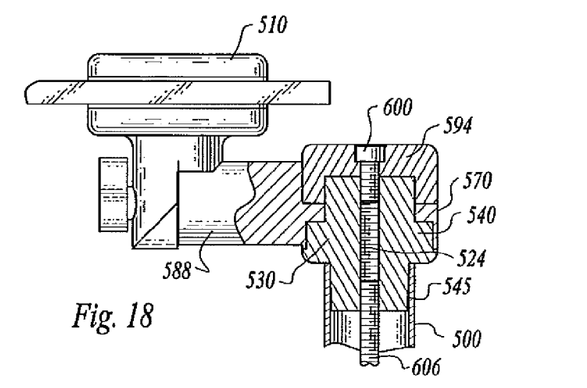
FIG. 18 is a cross-sectional view of an embodiment of the bracket assembly 12 affixed to an elongated support member 500 of FIG. 17 taken at "18-18."
Figure 19:
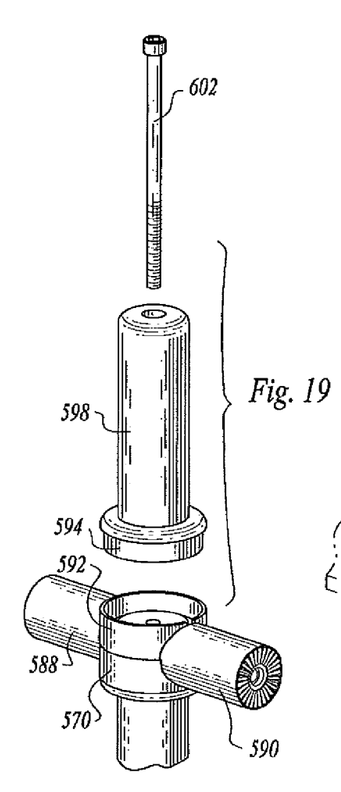
FIG. 19 is a partial exploded perspective view of an embodiment of the bracket assemblies 12 affixed to an elongated support member 500 of FIG. 11, depicting vertical extension member 598 and corresponding lengthened fastener 602.
Figure 20:
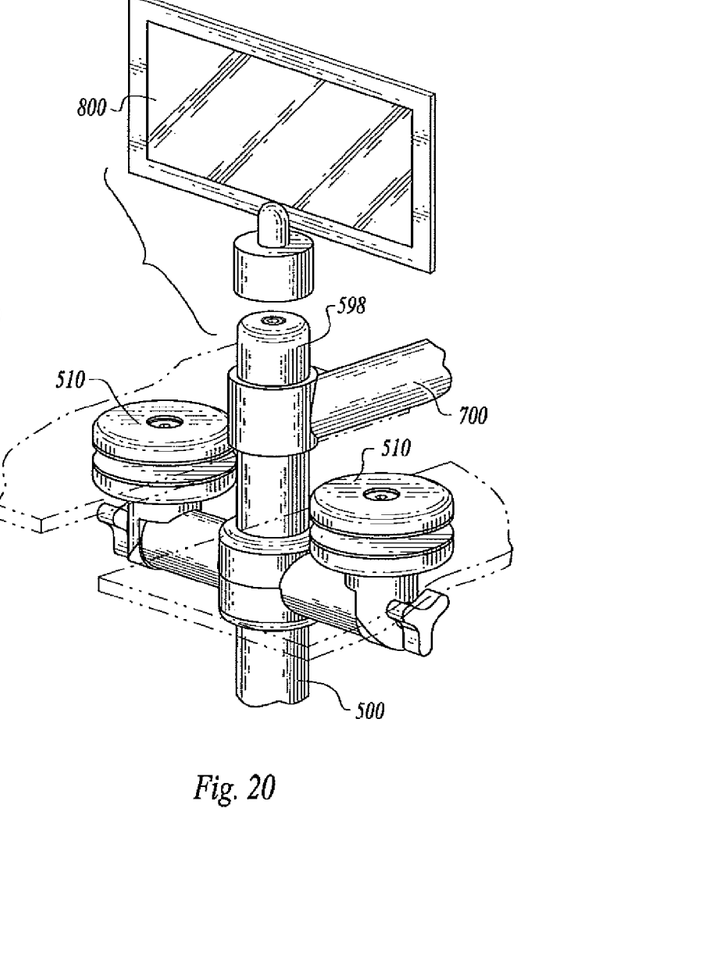
FIG. 20 is a partial exploded perspective view of an embodiment of the bracket assemblies 12 affixed to an elongated support member 500 of FIG. 11, depicting vertical extension member 598 and corresponding attached horizontal support member 700 and signage cap 800.

The embodiment of bracket assembly 12 includes a longitudinal axis 522, and a cylindrical base 530 having: a cylindrical base central longitudinal axis corresponding to the bracket assembly longitudinal axis 522; a cylindrical base top portion 540 having a first diameter; a cylindrical base center portion 550 having a second diameter larger than the top portion first diameter and further having a circular lip 552; a cylindrical base bottom portion 542; a cylindrical base bottom portion mitered end 545; and a cylindrical base internally threaded bore portion 524 along the longitudinal axis 522 through the cylindrical base 530 having a top opening 532 along the longitudinal axis 522 sized to correspond with a fastener 600 and a bottom opening sized to correspond with a fastener 606, FIGS. 14 and 18.

Figures 15, 16, 17:
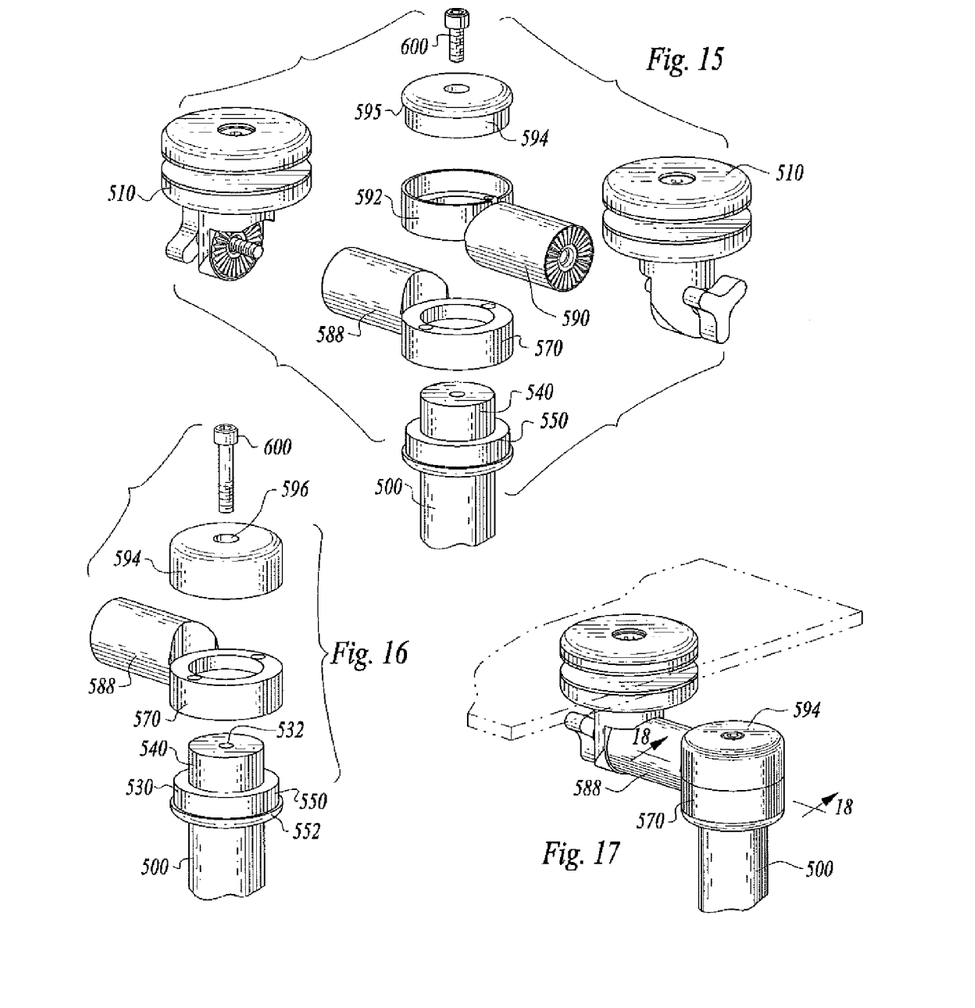
FIG. 15 is an exploded perspective view of an embodiment of the bracket assemblies 12 affixed to an elongated support member 500 of FIG. 11.
FIG. 16 is an exploded perspective view of an embodiment of the bracket assembly 12 affixed to an elongated support member 500 of FIG. 17.
FIG. 17 is a partial perspective view of an embodiment of bracket assembly 12 affixed to an elongated support member 500.

Embodiments of the bracket assembly 12 further includes at least one cylindrical core, 570, FIGS. 16-18, and 570 and 592 respectively, FIGS. 11-12, 14-15, 19-20, each cylindrical core having: a cylindrical core central longitudinal axis corresponding to the bracket assembly longitudinal axis 522; a cylindrical core large open end; a cylindrical core small open end; and an arm 588 and 590 respectively, FIGS. 14-15, fixed to the cylindrical core portion, 570 and 592 respectively, and orthogonally disposed to the central longitudinal axis 522. The large and small diameter open ends of the cylindrical cores 570 and 592 are sized to fit onto the cylindrical base top portion 540 and the cylindrical base center portion 550 and be locked into place by a fastener 600 or 602 through the cylindrical cap 594, the cylindrical core(s) 570 or 570 and 592, and into the cylindrical base internally threaded bore portion 524, FIGS. 14-20.

The cylindrical base circular lip 552 holds the cylindrical core 570, FIGS. 16-18, fitted onto the cylindrical base 540 and cylindrical base larger diameter center portion 550 for an embodiment of bracket assembly 12. Another embodiment of bracket assembly 12 includes a cylindrical cap top end having a circular lip 595 to hold cylindrical core 592, fitted onto the cylindrical base 540, FIG. 14.

The bracket assembly 12 further includes a cylindrical cap 594 having: a cylindrical cap central longitudinal axis longitudinal axis corresponding to the bracket assembly longitudinal axis 522; a circular longitudinally disposed internal opening 596 having a uniform diameter and a countersunk opening on the cylindrical cap top end sized to receive the fastener 600; and a cylindrical cap bottom end. An embodiment of bracket assembly 12 further includes a cylindrical cap 594 having a cylindrical cap top end having a circular lip 595. An embodiment of bracket assembly 12 further includes a cylindrical cap 594 having a vertical extension member 598 and corresponding lengthened fastener 602 to travel the length of the vertical extension member 596 and into the cylindrical base internally threaded portion 524 to secure the cylindrical cores, 570 and 592, FIGS. 19-20. The vertical extension member 598 is applicable for the embodiment of bracket assembly 12 further includes at least one cylindrical core, 570, FIGS. 16-18. A signage cap 800 or horizontal support member 700 can be added to the vertical extension member 598, FIG. 20.

The cylindrical cap 594 is secured to the cylindrical base 540 by fasteners 600 or 602 through the cylindrical cap longitudinally disposed internal groove 596, through one or more cylindrical cores 570 and 592, and into the cylindrical base internally threaded portion 524. Once the cylindrical base 540 is fastened to the cylindrical cap 594, the cylindrical base central longitudinal axis 522 and the cylindrical cap central longitudinal axis 522 are uniformly overlapped.

The assembled bracket assembly 12 can receive the elongated support member 500 from either the cylindrical base mitered end 545 with a centrally disposed support member threaded fastener 604 sized to correspond to the cylindrical base internally threaded portion 524. In this manner, at least two bracket assemblies 12 can be positioned with abutting, rotatable cylindrical cores 570 and 592, FIGS. 11-12, 14-15, 19-20, to allow arms, 588 and 590 respectively, FIGS. 14-15, affixed to cylindrical core portions 570 and 592 to receive bracketing hardware in each respective rotatably attached element 510 on each orthogonally affixed arm using any of the connection members from my U.S. Pat. No. 6,132,018 (the "'018 patent") (FIGS. 11-13 of the '018 patent) which are incorporated by reference as if fully set forth herein, in the orthogonally affixed arm end.

Figures 11, 12, 13:
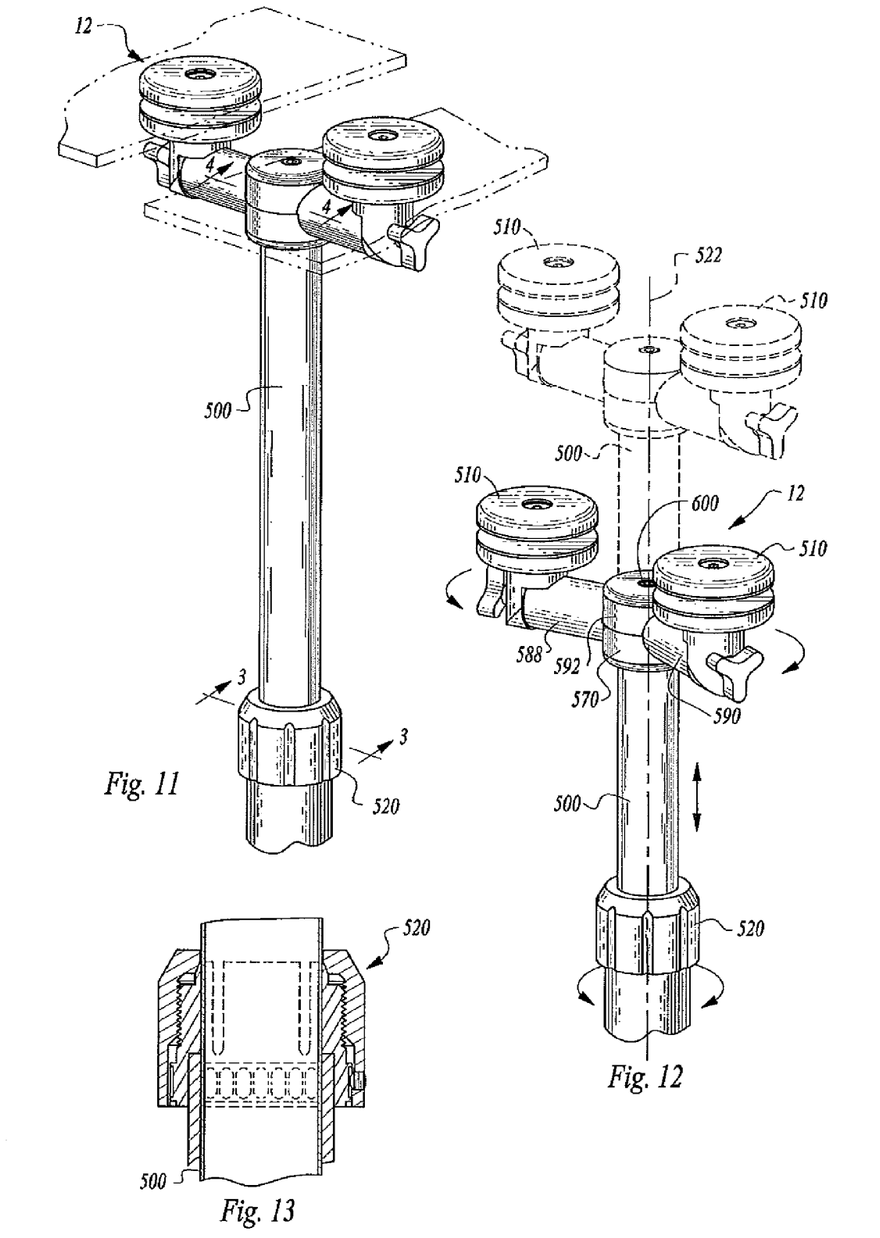
FIG. 11 is a perspective view of an embodiment of bracket assemblies 12 affixed to an elongated support member 500 having a cylindrical lock 520.
FIG. 12 is a perspective view of an embodiment of bracket assemblies 12 of FIG. 11 depicting vertical adjustment of the elongated support member 500 by release and tightening of the cylindrical lock 520, and rotational adjustment of abutting cylindrical cores 570 and 592 about the elongated support member 500 by release and tightening of the fastener 600, and the longitudinal centerline 522 of bracket assemblies 12, and the components thereof.
FIG. 13 is a cross-sectional view of the cylindrical lock 520 affixed to an elongated support member 500 of FIG. 11 taken at "13-13."

For an embodiment of a bracket assembly 12 for sneezeguard applications, FIGS. 11 and 12, this alignment feature of the bracket assembly provides an assembly that can easily and readily be adjusted vertically with the elongated support member 500 and cylindrical lock 520, and rotatably 360 degrees with respect to the elongated support member 500, while also providing 360 degree positional adjustment for any bracketing hardware. In this illustrated embodiment, the bracketing hardware is a sneezeguard glass element, affixed to the bracket assembly. For the preferred embodiment, the cylindrical lock is a collet assembly more completely detailed in FIGS. 1-3. As also depicted in FIG. 12, an embodiment of bracket assembly also allows assembly of sneezeguard glass elements at equal height and angular adjustment to provide, as one possible assembly, sneezeguard glass protection in a continuous plane extending on either side of the elongated support member 500. Similarly, the rotatably attached element 510 on each orthogonally affixed arm end may be positioned at any angle less than 180 degrees from the companion rotatably attached element 510 for abutting bracket assemblies 12 on elongated support member 500.

Once positioned on the elongated support member 500, an embodiment of the assembled bracket assembly 12 can readily and simply be repositioned upwards or downwards with the elongated support member 500 and cylindrical lock 520, or rotationally on the elongated support member 500 by releasing the fasteners, 600 or 602, adjusting at least one cylindrical core, 570, FIGS. 16-18, or both cylindrical cores, 570 and 592, FIGS. 11-12, 14-15, 19-20 to the desired position, and then securing the position by refastening fasteners, 600 or 602, to secure the assembled bracket assembly position relative to the elongated support member 500.

Operating the cylindrical lock 520 in a counterclockwise position relative to the elongated support member 500, FIG. 12, allows vertical adjustment of the elongated support member 500. Once the assembled bracket assembly 12 is in the desired position relative to the length of the elongated support member 500, the bracket assembly 12 is secured with the elongated support member 500 in the desired vertical position by operating the cylindrical base 520 in a clockwise position relative to the elongated support member 500. The cylindrical base 530 can then be locked into the tightened rotational position relative to the elongated support member 500 by threaded fastener 606 along an elongated support member central longitudinal axis corresponding to the bracket assembly longitudinal axis 522, and received into the cylindrical base threaded bore portion 524 bottom opening within the elongated support member 500 receiving the cylindrical base bottom portion mitered end 545 within the inside diameter of the elongated support member 500, FIGS. 4 and 8. Similarly, the rotatably attached element 510 on one orthogonally affixed arm 588 may be positioned at any angle 180 degrees or less from the companion rotatably attached element 510 on a second orthogonally affixed arm 590 for bracket assemblies 12 having abutting cylindrical cores, 570 and 592, FIGS. 11, 12, 14-15, and 19-20. This range of bracket assembly 12 positional arrangements provides the ability to meet a multitude of design and utility requirements quickly, easily and with a minimum number of components.

Anyone of a number of different bracket hardware rotatable elements 510 may be fitted onto each cylindrical core arm by the various attachment assemblies described in my '018 patent, which are incorporated by reference as if fully set forth herein, according to the desired utility of the overall bracketing hardware application.

The cylindrical base 530, cylindrical core 570 or cylindrical cores 570 and 592, the elongated support member 500, the cylindrical lock 520, and the cylindrical cap 594 are separate, unitary pieces preferably made of a strong metal such as aluminum or steel, or high strength carbon materials such as carbon fiber and carbon fiber-reinforced polymer.

Therefore, the foregoing is considered as illustrative only of the principles of the bracket assembly. Additionally, since numerous modifications and changes will readily occur to those skilled in the art, it is not desired to limit the bracket assembly to the exact construction and operation shown and described, and further, all suitable modifications and equivalents may be resorted to, falling within the scope of the bracket assembly.

I claim:

1. A bracket assembly comprising, in combination:
   a) a cylindrical base comprising a height and a central longitudinal axis, a cylindrical base top portion comprising a first diameter, a cylindrical base center portion comprising a second diameter larger than the first diameter and circular lip on an external surface, a cylindrical base bottom end portion comprising a third diameter slightly smaller than the cylindrical base top portion first diameter and further comprising a mitered end, and an internally threaded bore portion along the longitudinal axis through the cylindrical base and comprising a top opening and a bottom opening;
   b) a cylindrical core comprising a height, a central longitudinal axis, a cylindrical core first opening comprising a diameter sized to receive and be rotatably fitted upon the cylindrical base center portion diameter, a cylindrical core second opening comprising a diameter smaller than the diameter of the first cylindrical core opening sized to receive and be rotatably fitted upon the cylindrical base top portion diameter, and an arm orthogonally disposed to the cylindrical core central longitudinal axis and affixed to a cylindrical core external surface, the orthogonal arm comprising a length, an attachment end assembly on an arm end furthest from the cylindrical core central longitudinal axis and a concave partial arm end portion corresponding to a cylindrical core external surface;
   c) a cylindrical cap comprising a height, a central longitudinal axis, an external diameter, an internal diameter, an internal opening longitudinally disposed through the cylindrical cap and comprising a countersunk opening on a cylindrical cap top end, and a cylindrical cap bottom end;
   d) an elongated support member comprising an assembly for adjustable height, an internal threaded fastener member disposed along an elongated support member longitudinal axis and sized to be received into the cylindrical base threaded bore portion bottom opening, and an elongated support member internal diameter sized to receive and hold the cylindrical base bottom portion mitered end;

e) a threaded fastener sized to fit into and through the cylindrical cap internal opening and to correspond to and be received in the cylindrical base threaded top portion, wherein the position of any rotatably fitted cylindrical core arm of the bracket assembly is locked into place by tightening the fastener.

2. The bracket assembly according to claim 1, further comprising a second cylindrical core abutted to the cylindrical core rotatably fitted upon the cylindrical base, and wherein the cylindrical cap further comprises a circular lip on the cylindrical cap top end external diameter, whereby the cylindrical cap circular lip and the cylindrical base circular lip are sized to receive and hold cylindrical core external surfaces.

3. The bracket assembly according to claim 2, wherein each cylindrical core arm attachment end assembly comprises rotatable fastener means for receiving a fixture element.

4. The bracket assembly according to claim 2, wherein the cylindrical base, the cylindrical cores, the elongated support member, and the cylindrical cap are separate, unitary pieces comprising materials selected from the group consisting of aluminum, steel, high strength carbon materials, carbon fiber, and carbon fiber-reinforced polymers.

5. The bracket assembly according to claim 1, wherein the cylindrical core arm attachment end assembly comprises rotatable fastener means for receiving a fixture element.

6. The bracket assembly according to claim 1, wherein the cylindrical base, the cylindrical core, the elongated support member, and the cylindrical cap are separate, unitary pieces comprising materials selected from the group consisting of aluminum, steel, high strength carbon materials, carbon fiber, and carbon fiber-reinforced polymers.

7. A bracket assembly comprising, in combination:
   a) a cylindrical base comprising a height and a central longitudinal axis, a cylindrical base top portion comprising a first diameter, a cylindrical base center portion comprising a second diameter larger than the first diameter and circular lip on an external surface, a cylindrical base bottom end portion comprising a third diameter slightly smaller than the cylindrical base top portion first diameter and further comprising a mitered end, and an internally threaded bore portion along the longitudinal axis through the cylindrical base and comprising a top opening and a bottom opening;
   b) at least one cylindrical core comprising a height, a central longitudinal axis, a cylindrical core first opening comprising a diameter sized to receive and be rotatably fitted upon the cylindrical base center portion diameter, a cylindrical core second opening comprising a diameter smaller than the diameter of the first cylindrical core opening sized to receive and be rotatably fitted upon the cylindrical base top portion diameter, and an arm orthogonally disposed to the cylindrical core central longitudinal axis and affixed to a cylindrical core external surface, the orthogonal arm comprising a length, an attachment end assembly on an arm end furthest from the cylindrical core central longitudinal axis and a concave partial arm end portion corresponding to a cylindrical core external surface;
   c) a cylindrical cap comprising a height, a central longitudinal axis, an external diameter, an internal diameter, an internal opening longitudinally disposed through the cylindrical cap and comprising a countersunk opening on a cylindrical cap top end, a circular lip on the cylindrical cap top end external diameter, and a cylindrical cap bottom end;
   d) an elongated support member comprising an assembly for adjustable height, an internal threaded fastener member disposed along an elongated support member longitudinal axis and sized to be received into the cylindrical base threaded bore portion bottom opening, and an elongated support member internal diameter sized to receive and hold the cylindrical base bottom portion mitered end;
   e) a threaded fastener sized to fit into and through the cylindrical cap internal opening and to correspond to and be received in the cylindrical base threaded top portion, wherein the position of any rotatably fitted cylindrical core arm of the bracket assembly is locked into place by tightening the fastener.

8. The bracket assembly according to claim 7, wherein the cylindrical base, the cylindrical core, the elongated support member, and the cylindrical cap are separate, unitary pieces comprising materials selected from the group consisting of aluminum, steel, high strength carbon materials, carbon fiber, and carbon fiber-reinforced polymers.

9. The bracket assembly according to claim 7, wherein each cylindrical core arm attachment end assembly comprises rotatable fastener means for receiving a fixture element.

10. A bracket assembly comprising, in combination:
   a) an aluminum cylindrical base comprising a height and a central longitudinal axis, a cylindrical base top portion comprising a first diameter, a cylindrical base center portion comprising a second diameter larger than the first diameter and circular lip on an external surface, a cylindrical base bottom end portion comprising a third diameter slightly smaller than the cylindrical base top portion first diameter and further comprising a mitered end, and an internally threaded bore portion along the longitudinal axis through the cylindrical base and comprising a top opening and a bottom opening;
   b) at least one aluminum cylindrical core comprising a height, a central longitudinal axis, a cylindrical core first opening comprising a diameter sized to receive and be rotatably fitted upon the cylindrical base center portion diameter, a cylindrical core second opening comprising a diameter smaller than the diameter of the first cylindrical core opening sized to receive and be rotatably fitted upon the cylindrical base top portion diameter, and an arm orthogonally disposed to the cylindrical core central longitudinal axis and affixed to a cylindrical core external surface, the orthogonal arm comprising a length, an attachment end assembly on an arm end furthest from the cylindrical core central longitudinal axis comprising rotatable fastener means for receiving a fixture element, and a concave partial arm end portion corresponding to a cylindrical core external surface;
   c) an aluminum cylindrical cap comprising a height, a central longitudinal axis, an external diameter, an internal diameter, an internal opening longitudinally disposed through the cylindrical cap and comprising a countersunk opening on a cylindrical cap top end, a circular lip on the cylindrical cap top end external diameter, and a cylindrical cap bottom end;
   d) an aluminum elongated support member comprising an aluminum collet assembly for adjustable height, an internal threaded fastener member disposed along an elongated support member longitudinal axis and sized to be received into the cylindrical base threaded bore portion bottom opening, and an elongated support member internal diameter sized to receive and hold the cylindrical base bottom portion mitered end;

e) a threaded fastener sized to fit into and through the cylindrical cap internal opening and to correspond to and be received in the cylindrical base threaded top portion, wherein the position of any rotatably fitted cylindrical core arm of the bracket assembly is locked into place by tightening the fastener.

* * * * *